(12) United States Patent
Dumas et al.

(10) Patent No.: US 9,449,291 B2
(45) Date of Patent: Sep. 20, 2016

(54) SUBSCRIPTIONS FOR ROUTING INCOMING MESSAGES TO PROCESS INSTANCES IN A PROCESS EXECUTION ENGINE

(75) Inventors: Marlon G. Dumas, Rapla (EE); Torben Schreiter, Berlin (DE)

(73) Assignee: SAP SE, Walldorf (DE)

( * ) Notice: Subject to any disclaimer, the term of this patent is extended or adjusted under 35 U.S.C. 154(b) by 2155 days.

(21) Appl. No.: 11/946,735

(22) Filed: Nov. 28, 2007

(65) Prior Publication Data

US 2009/0138895 A1      May 28, 2009

(51) Int. Cl.
  G06F 3/00       (2006.01)
  G06Q 10/06      (2012.01)

(52) U.S. Cl.
  CPC .................................. *G06Q 10/06* (2013.01)

(58) Field of Classification Search
  None
  See application file for complete search history.

(56) References Cited

U.S. PATENT DOCUMENTS

| | | | |
|---|---|---|---|
| 6,366,926 B1 | 4/2002 | Pohlmann et al. | |
| 6,446,136 B1 | 9/2002 | Pohlmann et al. | |
| 6,732,153 B1 | 5/2004 | Jakobson et al. | |
| 6,766,368 B1 | 7/2004 | Jakobson et al. | |
| 7,209,916 B1 | 4/2007 | Seshadri et al. | |
| 2005/0209990 A1* | 9/2005 | Ordille et al. | 707/1 |
| 2005/0261923 A1* | 11/2005 | Brown et al. | 705/1 |
| 2006/0074735 A1* | 4/2006 | Shukla et al. | 705/8 |
| 2006/0179342 A1* | 8/2006 | Reed et al. | 714/4 |
| 2007/0130363 A1* | 6/2007 | Barros | 709/238 |
| 2008/0010334 A1* | 1/2008 | Kovales et al. | 709/200 |

OTHER PUBLICATIONS

Motahari Nezhad, Hamid R., et al., "Message Correlation for Conversation Reconstruction in Service Interaction Logs", Technical Report #DIT-07-010, University of New South Wales, School of Computer Science and Engineering, Mar. 2007.
Aldred, Lachlan et al., "Communication Abstractions for Distributed Business Processes", CAiSE 2007, LNCS 4495, pp. 409-423, (2007).
Barros, Alistair et al., "Service Interaction Patterns", BPM 2005, LNCS 3649, pp. 302-318, (2005).
Barros, Alistair et al., "Correlation Patterns in Service-Oriented Architectures", FASE 2007, LNCS 4422, pp. 245-259, (2007).
Aldred, Lachlan et al., "On the Notion of Coupling in Communication Middleware", On the Move to Meaningful Internet Systems 2005: CoopIS, DOA, and ODBASE, LNCS 3761, pp. 1015-1033, (2005).

(Continued)

*Primary Examiner* — H S Sough
*Assistant Examiner* — Carina Yun
(74) *Attorney, Agent, or Firm* — Brake Hughes Bellermann LLP

(57) ABSTRACT

An orchestration engine may execute multiple, concurrently running instances of a process model, where each of the instances of the process model includes one or more receiving objects. A messaging endpoint may be shared by the instances of the process model and may be configured to receive messages. A subscription handler may handle multiple subscriptions for the instances and may be configured to define a first subscription for a first instance of the multiple instances, where the first subscription includes a correlation expression, an association with the messaging endpoint, and an association with a first receiving object within the first instance. The subscription handler also may associate the first subscription with the first instance and initialize the first subscription associated with the first instance. A routing manager may route received messages that match the first subscription to the first receiving object.

20 Claims, 4 Drawing Sheets

(56) References Cited

OTHER PUBLICATIONS

Eugster, Patrick et al., "The Many Faces of Publish/Subscribe", ACM Computing Surveys, vol. 35, No. 2, Jun. 2003, pp. 114-131, (Jun. 2003).

"IBM Correlation sets in BPEL processes", [online] [retrieved on Nov. 21, 2007] Retrieved from the Internet <URL http://www-1.ibm.com/support/docview.wss?rs=1079&tc=SSCXMC.

Sadtler, Carla et al., "Enabling SOA using WebSphere Messaging", [online] Websphere software, IBM SG24-7163-00, (Feb. 27, 2006), Retrieved from the Internet <URL ibm.com/rebooks.

Thatte, Satish "Xlang—Web Services for Business Process Design", [online] (2001) [retrieved on Nov. 21, 2007] Retrieved from the Internet <URL http://www.getdotnet.com/team/xml_wsspecs/xlang-c/default.htm.

"Web Services Business Process Execution Language Version 2.0", [online] (Apr. 11, 2007) OASIS Standard, Retrieved from the Internet <URL http://docs.oasis-open.org/wsbpel/2.0/OS/wsbpel-v2.0-OS.html.

Butek, Russell "Building an aggregation function using WebSphere ESB", [online] (Aug. 15, 2007) [retrieved on Dec. 26, 2007] Retrieved from the Internet <URL http://www.ibm.com/developerworks/websphere/library/techarticles/0708_butek/0708_butek.html.

"Building the request flow", [online] (2005) [retrieved on Dec. 26, 2007] Retrieved from the Internet <URL http://publib.boulder.ibm.com/infocenter/dmndhelp/v6rxmx/index.jsp?topic=/com.ibm.wbit.sample.tech.6.sib.doc/msgelementsetter/topics/tbldflow.html.

Credle, Rufus et al., "Patterns: SOA Design Using WebSphere Message Broker and WebSphere ESB", [online] (Jul. 2007) Retrieved from the Internet <URL http://www.redbooks.ibm.com/redbooks/pdfs/sg247369.pdf.

Christensen, Soren et al., "Coloured Petri Nets Extended with Place Capacities, Test Arcs and Inhibitor Arcs", Lecture Notes in Computer Science, vol. 691, Proceedings of the 14th International Conference on Application Theory of Petri Nets, Springer-Verlag / London, UK, (1993), pp. 186-205.

Lakos, Charles et al., "A General Systematic Approach to Arc Extensions for Coloured Petri Nets", Lecture Notes in Computer Science, vol. 815, Application and Theory of Petri Nets 1994, Springer Berlin / Heidelberg, (1994), pp. 338-357.

Mulyar, Nataliya et al., "Towards a Pattern Language for Colored Petri Nets", Sixth Workshop and Tutorial on Practical Use of Coloured Petri Nets and the CPN Tools, Aarhus, Denmark, Oct. 24-26, 2005, pp. 39-58.

\* cited by examiner

SUBSCRIPTIONS FOR ROUTING INCOMING MESSAGES TO PROCESS INSTANCES IN A PROCESS EXECUTION ENGINE

TECHNICAL FIELD

This description relates to enabling subscriptions for instance routing of incoming messages in a process execution engine.

BACKGROUND

Modeling languages may be used to describe processes, such as business processes, for the purpose of coordinating and facilitating their execution. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, process modeling may be used to provide integration of business applications both within and across enterprise organizations.

For example, one application of process modeling includes automated business-to-business (B2B) applications that rely on communications between actors using message exchanges. If the involved actors are instances of business process models executed by multiple business process execution engines, the proper functioning of the automated B2B applications may rely on the premise that messages sent by another party arrive at the correct process instance executed by the process execution engine. It may often be the case that multiple process instances of the same business process model are being executed concurrently, and that messages flowing to and from these process instances arrive and depart through shared messaging channels. Thus, when a message arrives to a channel that is shared by multiple, concurrently running business process instances, the successful performance of the B2B application may depend on determining which instance or instances to route the incoming message.

SUMMARY

According to one general aspect, a process execution engine, hitherto called an orchestration engine, may execute multiple, concurrently running instances of a process model, where each of the instances of the process model includes one or more receiving objects. A messaging endpoint may be shared by the instances of the process model and may be configured to receive messages. A subscription handler may handle multiple subscriptions for the instances and may be configured to define a first subscription for a first instance of the multiple instances, where the first subscription includes a correlation expression, an association with the messaging endpoint, and an association with a first receiving object within the first instance. The subscription handler also may associate the first subscription with the first instance and initialize the first subscription associated with the first instance. A routing manager may route received messages that match the first subscription to the first receiving object.

According to another general aspect, a computer program product for enabling subscriptions for instance routing of messages may be tangibly embodied on a computer-readable medium and include executable code that, when executed, is configured to cause at least one data processing apparatus to execute an orchestration engine. The orchestration engine may be configured to execute multiple, concurrently running instances of a process model, where each of the instances includes one or more receiving objects and the orchestration engine may be configured to spawn a subscription handler. The subscription handler may be configured to define a first subscription for a first instance of the multiple instances, where the first subscription includes a correlation expression, an association with a messaging endpoint, and an association with a first receiving object within the first instance. The subscription handler also may associate the first subscription with the first instance and initialize the first subscription associated with the first instance. The orchestration engine may route messages received at the messaging endpoint that match the first subscription to the first receiving object.

The details of one or more implementations are set forth in the accompanying drawings and the description below. Other features will be apparent from the description and drawings, and from the claims.

DETAILED DESCRIPTION

Figure 1:
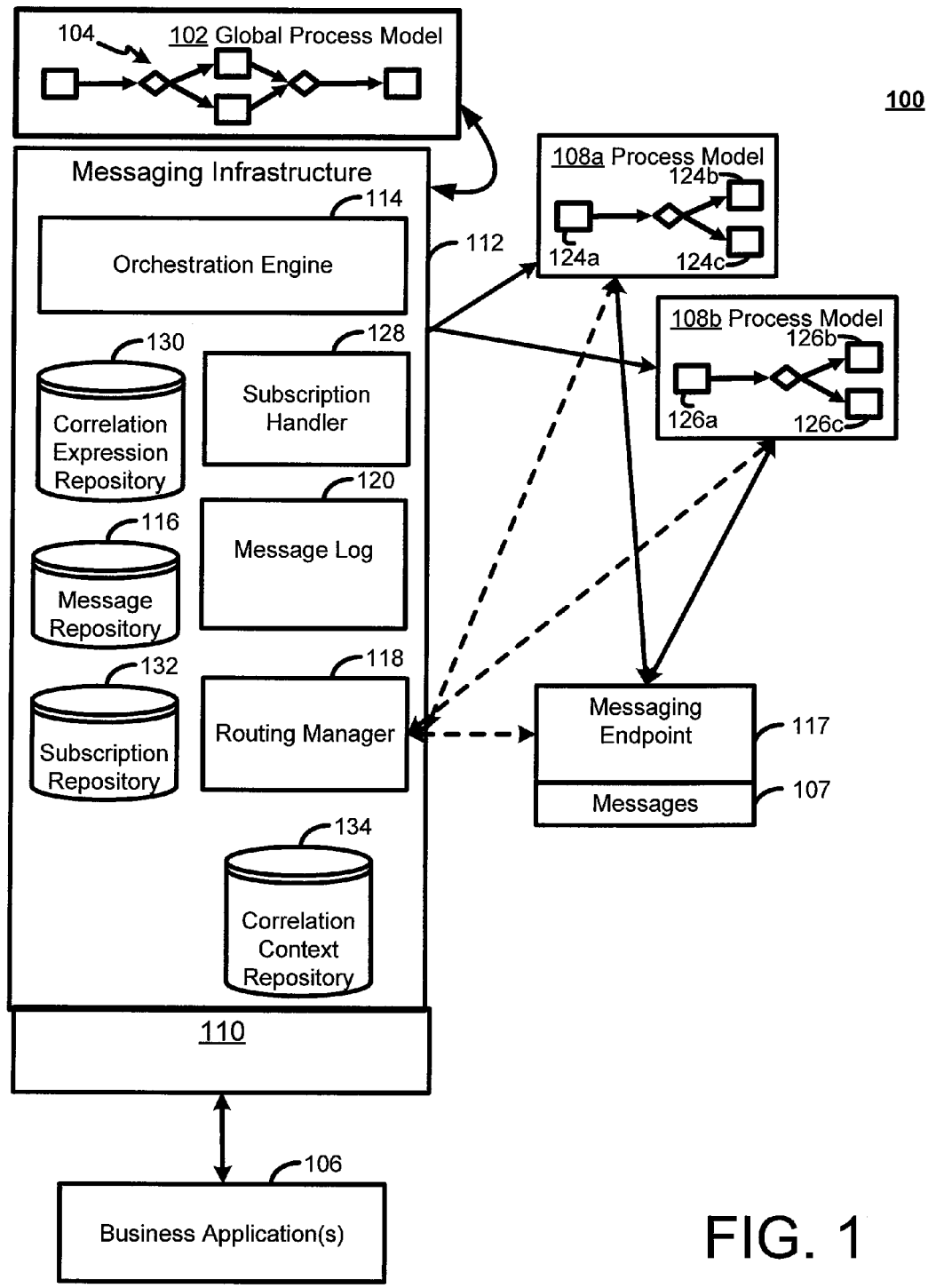
FIG. 1 is an exemplary block diagram of a system for enabling subscriptions for routing messages to instances of a process model.

FIG. 1 is a block diagram of a system 100 for enabling subscriptions for routing messages to instances of a process model. In the example of FIG. 1, the system 100 is operable to allow process instances to subscribe to messages of a certain form so that incoming messages that are flowing through a messaging endpoint, which is shared among multiple, concurrently running instances of a process model, are routed to the correct process instance. Process instances place subscriptions with a shared messaging endpoint. The subscriptions include a correlation expression that may be used to match against messages flowing through the messaging endpoint. In this manner, messages that match the correlation expression contained in the subscription are routed to the correct process instance. More specifically, the system 100 is operable to allow messages to be routed to a specific receiving object within a specific process instance, where each process instance may include multiple receiving objects. Furthermore, the system 100 enables multiple subscriptions to be grouped into a single correlation context that may be used for routing messages flowing through the shared messaging endpoint to the correct receiving object within a specific process instance. Consequently, the system 100 provides workflow designers and users with the ability to implement workflow process models that include more flexibility in routing messages and in a manner that more accurately and completely reflects real-world usage scenarios of message routing. The system 100 enables workflow designers and users to use arbitrary expressions for correlation identifiers that may even overlap among different process instances, instead of being constrained to distinct and non-overlapping, value-based correlation identifiers.

In the example of FIG. 1, a global process model 102 represents a business process model that is implemented, and agreed on, by a number of collaborating service providers, such that the service providers perform tasks 104 of the global process model 102. The service providers may make pre-arrangements regarding their interactions with one another (e.g., arrangements governing messages, message formats, or message types, as well as arrangements governing an order of the messages to be sent and/or tasks to be performed). By way of specific example, a purchase order may be sent by one service provider that may require either acknowledgement or rejection by one or more other service provider(s). The global process model 102 (also referred to as a global choreography model) thus provides a way of capturing, contractualizing, and implementing potentially complex and long-running message exchange sequences between service providers, in order to execute a desired business process.

For example, a business application 106 may be built and implemented by an enterprise or other entity to perform some business functionality, such as, for example, creating a purchase order and sending the purchase order or loan request to a number of (possibly competing) suppliers. The business application 106 may implement multiple instances of local process models 108a, 108b that, analogously to the global process model 102, formalize and define the roles of the business application 106 within the global process model 102, e.g., with respect to the purchase order or loan request example(s) just mentioned. For example, the local process models 108a, 108b may describe what types of messages may or should be exchanged with the suppliers as part of the purchase order.

In the example of FIG. 1, tasks of the global process model 102 and the local process models 108a, 108b are executed at least in part using application services. For example, the business application 106 and the local process models 108a, 108b may be associated with at least one service 110. In this context, the service 110 refers to an application having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service.

Using such services and service interactions to implement process models may be referred to as a service-oriented architecture (SOA), in which, as just described, process tasks result in execution of the services. Further, processes that rely on services to realize process steps may themselves be deployed and accessed as services, which may be referred to as process-based service composition. Languages exist, such as, for example, the Business Process Execution Language (BPEL), that are designed to provide such compositions of services (e.g., web services), and thus provide a top-down, process-oriented approach to the SOA. Accordingly, BPEL or other such languages (such as, for example, the Web Services Flow Language (WSFL), the eXtensible language (XLANG), and/or the Business Process Modeling Language (BPML)), or modifications/extensions thereof, may be used to define the global process model 102 and/or the local process model 108.

In FIG. 1, in order to integrate the service 110 within the global process model 102, a messaging infrastructure 112 is included. Generally, the messaging infrastructure 112 facilitates instantiation and execution of the local process models 108a, 108b. The messaging infrastructure 112 includes an orchestration engine 114 that is operable, among other functions, to execute multiple, concurrently running instances of the local process model 108a, 108b. For example, the orchestration engine 114 may be in charge of ensuring that a given task of the local process models 108a, 108b has actually been executed and completed, before allowing the instance to proceed to a following task. In one exemplary implementation, in the case where the business application 106 is used to process purchase orders, the orchestration engine 114 may instantiate one instance of the local process model to process a single purchase order, including all of the tasks associated with processing the purchase order. Thus, the orchestration engine 114 may instantiate a first instance of the local process model 108a to process a first purchase order and the orchestration engine 114 may instantiate a second instance of the local process model 108b to process a second purchase order. It will be apparent that although only two instances 108a, 108b are illustrated in FIG. 1 that many multiple instances of the local process model may be executed, often concurrently, with the instances being instantiated and terminated at different, and often overlapping, times. Other functions and examples of the orchestration engine 114 are described in more detail, below.

A message repository 116 represents a database or other memory that may be used, for example, to store message types or templates, as well as actual messages 107 (including both outgoing and/or incoming messages). For example, as described in more detail below, the message repository 116 may include a number of message types that are specific to, or associated with, (functionality of) the business application 106. For instance, in the case where the business application 106 is used to process received purchase orders, there may be a number of associated message types in the message repository 116, which may be pre-configured to some extent based on, for example, a type of purchase order or an identity of the recipient(s) of the purchase order.

The system 100 may include a messaging endpoint 117. The messaging endpoint 117 may be an element in the workflow process where messages 107 flow into the system 100. The messaging endpoint 117 may be considered an inbox for messages 107 incoming to the process models 108a, 108b and to the messaging infrastructure 114. As illustrated in FIG. 1, the messaging endpoint 117 may be shared among multiple process models 108a, 108b. The messaging endpoint 117 may be identified by an address or other type of identifier. For example, the messaging endpoint 117 may be identified by a uniform resource locator (URL).

A routing manager 118 may be used to send and receive actual messages of the messaging infrastructure 112 during communications with other services and other messaging infrastructures (not shown). For example, in a case where the orchestration engine 114 is executing multiple instances of the local process model 108a, 108b, the routing manager 118 may be responsible for sending messages of the various instances to the appropriate recipients, using appropriate transmission techniques and/or protocols. Conversely, for incoming messages, the routing manager 118 may be used to route messages to the correct process instance 108a, 108b, and more specifically, to the correct receiving object within the correct process instance 108a, 108b. Further, for incoming messages 107, the routing manager 118 may be used to sort and/or route messages to appropriate portions of the messaging infrastructure 112, the service 110, and/or the business application 106.

The routing manager 118 also may serve as a buffer or queue for incoming and outgoing messages. In this regard, for example, the routing manager 118 may serve as a queue for incoming messages, which may ultimately be forwarded to a message log 120. The message log 120 may be used to track each incoming (and outgoing) message(s), and, ultimately, persist the messages to the message repository 116. Other functions and examples of the routing manager 118 are described in more detail, below.

Thus, for example, the process models 108a, 108b may describe tasks to be performed, as well as messages that may be sent/received as part of such tasks, by a manufacturer as part of a manufacturing process, or by some other party/entity. As referenced above, such process models generally include a plurality of nodes or tasks that are joined and ordered to obtain a desired result. That is, as illustrated by the example process models 108a, 108b illustrated in FIG. 1 (which is intended merely as a conceptualization or illustration of a process model having multiple synchronizations, and not intended necessarily to represent a particular process model being executed in FIG. 1), nodes/tasks may be joined by appropriate edges (arrows) and control tasks (e.g., splits and/or joins) to obtain structures including parallel tasks, iterative tasks, nested loops, or other known task progressions.

The process models 108a, 108b may include one or more receiving objects. For example, process model 108a may include receiving objects 124a, 124b, 124c and process model 108b may include receiving objects 126a, 126b, 126c. A receiving object is an element in the process model that, when executed by the process model, may fetch and process one or more messages that are incoming to the process model through the common messaging endpoint 117. Once the receiving object receives a message, the receiving object consumes the message and takes an action.

In the example of FIG. 1, a single process model (e.g., process model 108a) may be dedicated to handling all aspects of the tasks for a specific purchase order including, for instance, receiving the purchase order, fulfilling the purchase order, preparing the goods associated with the purchase order for delivery, shipping the goods associated with the purchase order, tracking the delivery of the goods associated with the purchase order and processing the invoice associated with the purchase order. One or more of the receiving objects (e.g., receiving objects 124a, 124b, 124c) may be associated with each one of these tasks. Thus, for example, there may be one or more receiving objects for the task of receiving the purchase order and one or more receiving objects for fulfilling the purchase orders, as well as one or more receiving objects for the other tasks associated with the processing of the purchase order.

In the example of FIG. 1, a business may receive multiple purchase orders from multiple different customers. In this example, the business may receive thousands of different purchase orders from many different customers and the business needs to process all of those purchase orders. As discussed above, each purchase order may have a separate process model instance (e.g., process model 108a) associated with the purchase order. The messaging endpoint 117 may serve as a single entry point and as a shared inbox for all of the messages incoming to each process model associated with each of the purchase orders. Since the messaging endpoint 117 may be shared among multiple process models 108a, 108b that may be running in parallel, where each of the process models 108a, 108b may include multiple receiving objects, it is important that the incoming messages are matched with and routed to the correct process instance. More specifically, it is important that the incoming messages are matched with and routed to the correct receiving object within the process model instance.

System 100 provides a mechanism to correlate messages incoming to the messaging endpoint 117 with the correct process model and, more specifically, with the correct receiving object within the process model. The messaging infrastructure includes a subscription handler 128 that is arranged and configured to handle subscriptions for the process models 108a, 108b, where the process models 108a, 108b subscribe to messages of a certain form so that incoming messages to the messaging endpoint 117 are routed to the correct receiving object. The orchestration engine 114 may spawn and/or otherwise control the operation of the subscription handler 128. The subscription handler 128 may define a subscription for the process model to include an association with a messaging endpoint 117, a correlation expression, and an association with a receiving object. Similar to a business application 106 having multiple process models 108a, 108b, the business application 106 also may have multiple messaging endpoints. Thus, the subscription includes an association with the messaging endpoint so that the subscription handler knows at which messaging endpoint to place the subscription. For example, if the messaging endpoint 117 includes a URL, then the subscription may include the same URL so that the associated receiving object may fetch messages from the appropriate messaging endpoint 117.

The subscription also includes a correlation expression. A correlation expression may be an arbitrary function and/or expression that is used to match against messages received at the associated messaging endpoint 117. In one exemplary implementation, the correlation expression may include an attribute-based expression. For instance, in the example of FIG. 1, an attribute-based expression may include an expression that includes a purchase order identifier such as, a purchase order number. In another example, an attribute-based expression may include an expression that includes a particular shipping address or portion of a shipping address such as a specific zip code. Thus, a receiving object (e.g., 124a) that is part of a subscription that includes an attribute-based correlation expression would fetch messages that match the attribute-based correlation expression.

In another exemplary implementation, the correlation expression may include a time-based expression. For example, a time-based correlation expression may be an expression that includes any purchase order that has arrived within the last sixty minutes. Thus, a receiving object (e.g., 124b) that is part of a subscription that includes a time-based expression would fetch messages that match the time-based correlation expression.

In another exemplary implementation, the correlation expression may include a function-based expression such as a property-based expression or a time-interval based expression. Other correlation expressions may include pattern-based expressions such as, for example, reference-based expressions and moving time-window expressions. Furthermore, a correlation expression may include any combination of these types of expressions.

As can be noted from the different examples of correlation expressions discussed above, subscriptions may be defined at varying levels of granularity. For example, a subscription that includes an attribute-based correlation expression that includes a specific purchase order number would apply at the level of the overall purchase order. Thus, any message received at the messaging endpoint that includes the specific purchase order number, would be fetched by the receiving object. In other examples, a subscription may be defined at a finer level of granularity. For example, a subscription may include an attribute-based correlation expression that is focused more specifically on line item attributes within a line item in a purchase order. Thus, the use of subscriptions and correlation expressions gives workflow designers and users a great level of flexibility and specificity in defining which receiving objects within a process model should receive which messages to allow for highly efficient workflows.

The messaging infrastructure 114 may include a correlation expression repository 130, which may include pre-defined correlation expressions and/or an overall database for all of the correlation expressions associated with a particular business application 106 and/or process model 108a, 108b. Furthermore, the messaging infrastructure 114 may include a subscription repository 132 that stores the subscriptions for the business application 106 and/or process models 108a, 108b. At the time when the global process model 102 is defined, the correlation expressions and the subscriptions may be defined. The defined correlation expressions and the defined subscriptions may be stored in the correlation expression repository 130 and the subscription repository 132, respectively.

The subscription handler 128 may be arranged and configured to associate a subscription with a process model instance (e.g., 108a or 108b) and to initialize the subscription. Once the subscription handler 128 initializes the subscription, then the receiving object associated with the subscription may begin receiving messages from routing manager 118 that match the correlation expression in the subscription. The subscription handler 128 may initialize the subscription at any point during the execution of the process model. The orchestration engine 114 may provide instructions to the subscription handler 128 as to when a particular subscription should be initialized.

Subscriptions are not limited to static and/or pre-defined subscriptions. In one exemplary implementation, the subscription handler 128 may be configured to modify a subscription during the execution of a process model (e.g., process model 108a). The subscription handler 128 may modify the subscription in different ways, including by changing the correlation expression, by changing the messaging endpoint the subscription is associated with, and/or by changing the receiving object that is associated with the subscription. A subscription may be modified based on the state of the process model and the modification may be initiated by the orchestration engine 114, which may be monitoring the state of the process models 108a, 108b. The subscription handler 128 may update the subscription repository 132 with any modified subscriptions. To modify the subscription, the subscription handler 128 may send a message to the routing manager 118 and/or to the messaging endpoint 117.

In another exemplary implementation, the subscription handler 128 may terminate a subscription during the execution of the process model. Thus, once the subscription handler 128 terminates a particular subscription, then the receiving object associated with that subscription will not receive messages from the routing manager 118. To terminate a subscription, the subscription handler 128 may send a message to the routing manager 118 and/or to the messaging endpoint 117.

The subscription handler 128 may define and initialize individual subscriptions, as discussed above, and also may define and initialize groups of subscriptions. In one exemplary implementation, the subscription handler 128 may initialize a group of subscriptions, where the subscriptions may be different from each other and/or may be overlapping with each other. For example, a first subscription may include a correlation expression and may be associated with a first receiving object (e.g., receiving object 124a). A second subscription may include the same correlation expression and may be associated with a second receiving object (e.g., receiving object 124b), where the first receiving object 124a and the second receiving object 124b are within the same process model 108a. The subscription handler 128 may initialize these two subscriptions together as a group of individual subscriptions. When a message arrives at the messaging endpoint that matches the correlation expression, the routing manager 118 may deliver the message to one of the receiving objects 124a, 124b based on a receive state of the subscribed receiving objects.

In another exemplary implementation, the subscription handler 128 may group the first subscription and the second subscription into a single entity called a correlation context. A correlation context is a group of subscriptions. A correlation context may include a set of tuples that includes a set of correlation expressions specific to a particular correlation context and valid for all contained subscriptions that it includes. In this manner, the use of a correlation context enables the grouping of multiple subscriptions to handle incoming messages that match the same correlation expression. Then, when an incoming message at the messaging endpoint 117 matches the correlation expression, the routing manager 118 delivers the message to the receiving object that is in a receive state to receive the particular message. In the example of FIG. 1, a first receiving object 124a may be designated to consume messages for tracking the delivery of goods associated with a particular purchase order and a second receiving object 124b may be designated to consume messages for processing the invoice associated with the same purchase order. In this example, the correlation expression may be an attribute-based expression, where the expression matches against the purchase order number. A message received at the messaging endpoint 117 that relates to tracking the goods may include the purchase order number and another message received at the messaging endpoint 117 that relates to the invoice also may include the same purchase order number. Thus, each of the messages would match the correlation context and the routing manager 118 would decide which message gets routed to which receiving object. For instance, when the message arrives relating to tracking the delivery, the first receiving object 124a may be in a state to receive messages, and the second receiving object 124b that is associated with the invoice processing may not be in a state to receive messages. Thus, the routing manager 118 would deliver the matching message to the first receiving object 124a. The orchestration engine 114 may control the overall functioning of which receiving objects in a process model are in a state to receive messages and may provide such information to the routing manager 118.

The messaging infrastructure 114 may include a correlation context repository 134 that is configured to store the defined correlation contexts. As discussed above with respect to subscriptions, correlation contexts may be defined at the time of design of the workflow process. Like subscriptions, correlation contexts are not limited to static and/or pre-defined correlation contexts. In one exemplary implementation, the subscription handler 128 may be configured to modify a correlation context during the execution of a process model (e.g., process model 108a). The subscription handler 128 may modify the correlation context in different ways, including by changing the correlation expression and/or by changing the messaging endpoint the correlation context is associated with. A correlation context may be modified based on the state of the process model and the modification may be initiated by the orchestration engine 114, which may be monitoring the state of the process models 108a, 108b. The subscription handler 128 may update the correlation context repository 134 with any modified correlation contexts. To modify the correlation context, the subscription handler 128 may send a message to the routing manager 118 and/or to the messaging endpoint 117.

Furthermore, the subscription handler 128 may terminate a correlation context during the execution of the process model. Thus, once the subscription handler 128 terminates a particular correlation context, then the subscriptions and the receiving objects associated with that correlation context will not receive messages from the routing manager 118. To terminate a correlation context, the subscription handler 128 may send a message to the routing manager 118 and/or to the messaging endpoint 117.

The use of correlation contexts enables greater efficiency for workflow designers and users enables a smoother flow of the process by enabling the grouping of subscriptions that share the same correlation expression into a single entity, rather than having multiple subscriptions.

Although FIG. 1 is discussed in terms of business processes associated with the illustrated global process model 102, the business application 106, the local process models 108a, 108b, as well as the various service and messaging systems, it will be appreciated that FIG. 1 is only an example context. For example, the term business application should be interpreted broadly as including any application that is used in profit generation of some sort, although the business application 106 also may refer to non-profit endeavors as well, including, for example, schools, churches, charities, hospitals, or virtually any other organization. Further, the business application 106 is merely an example, and other applications, such as applications for personal use, also may be used. Consequently, the subscription handler 128 and the routing manager 118 may be used in virtually any scenario in which subscriptions may be used for routing of messages to receiving objects, especially in the context of more complex process model scenarios including many multiples of instances of process models.

Figure 2:
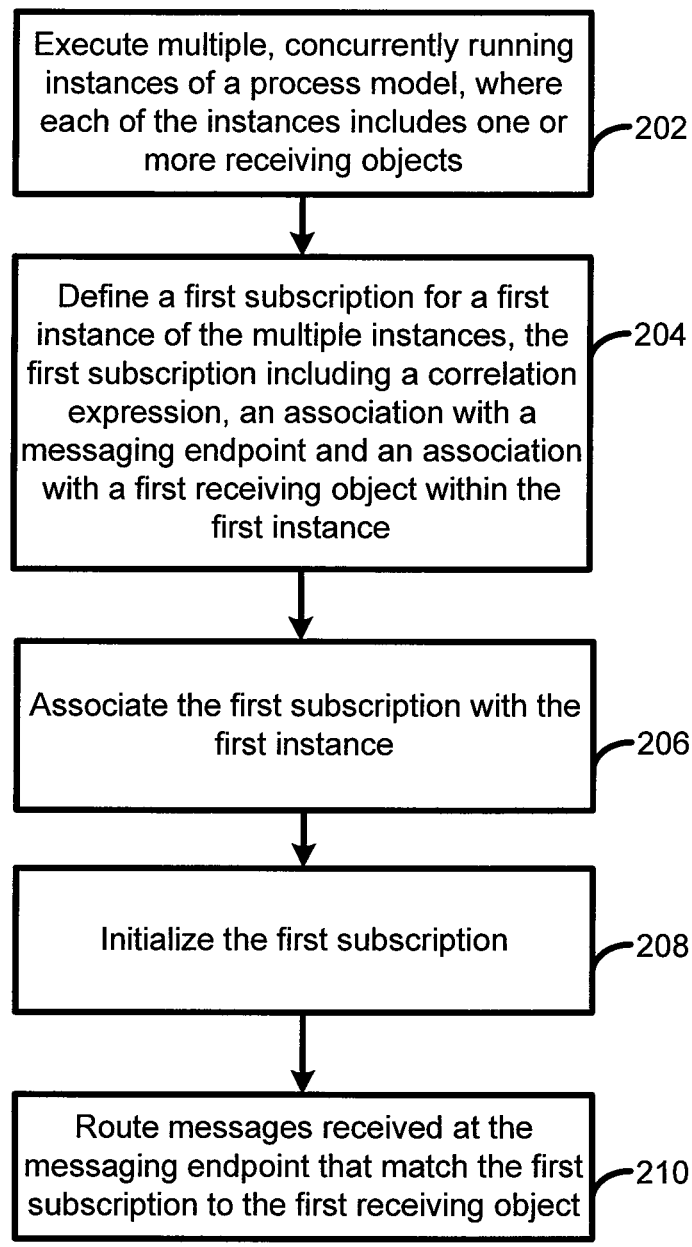
FIG. 2 is a flowchart illustrating an operation of the system of FIG. 1.

FIG. 2 is a flowchart 200 illustrating an operation of the system of FIG. 1. In FIG. 2, multiple, concurrently running instances of a process model may be executed, where each of the instances includes one or more receiving objects (202). For example, the orchestration engine 114 may execute multiple, concurrently running process models 108a, 108b, where process model 108a includes receiving objects 124a, 124b, 124c and process model 108b includes receiving objects 126a, 126b, 126c (202). As discussed above with respect to the example in FIG. 1, each of the process models 108a, 108b may be defined to handle tasks associated with processing purchase orders.

A subscription may be defined for an instance of the multiple instances, where the subscription includes a correlation expression, an association with a messaging endpoint and an association with a first receiving object within the instance (204). For example, the subscription handler 128 may define a subscription for a process model (e.g., 108a or 108b). When defining the subscription (204), the subscription handler 128 may use correlation expressions that have been stored in the correlation expression repository 130. The subscription may include the address of the messaging endpoint 117 to satisfy the association with a messaging endpoint. The subscription also includes an association with a receiving object such as, for example, one of the receiving objects 124a, 124b, 124c, 126a, 126b, and 126c.

The subscription is associated with an instance of the process model (206) and the subscription is initialized (208). For example, the subscription handler 128 may associate the subscription with one of the process models 108a, 108b (206) and the subscription handler 128 may initialize the subscription (208). The subscription handler 128 may initialize the subscription by sending a message to the routing manager 118 and/or by sending a message to the messaging endpoint 117.

Messages received at the messaging endpoint that match the subscription are routed to the receiving object that is contained in the subscription (210). For example, messages are received at the messaging endpoint 117. The routing manager 118 may route the received messages that match the subscription to the receiving object that is associated with the subscription. For instance, if the receiving object 124a is associated with the subscription, then when a message matches the correlation expression in the subscription, the routing manager 118 routes the message to the receiving object 124a.

As discussed above with respect to FIG. 1, the subscription handler 128 may modify the subscription by changing the correlation expression during the execution of the process model. The subscription handler 128 also may modify the subscription by associating a different receiving object with the subscription and/or by associating a different messaging endpoint with the subscription. Furthermore, the subscription handler 128 may terminate a subscription during the execution of the process model by sending a message to the routing manager 118 and/or the messaging endpoint 117.

In one exemplary implementation, the subscription handler 128 may define a subscription that may be used to create a new process model that has not yet been instantiated by the orchestration engine 114. For instance, in the example of FIG. 1, the subscription handler 128 may define a subscription that includes a correlation expression, an association with the messaging endpoint 117. If the subscription does not include an association with a specific receiving object and/or an association with a specific process model instance, then any received message that matches the correlation expression may be delivered to the orchestration engine 114 for processing. For example, the correlation expression may include an expression related to request for quotes. Since a request for quote may not refer to any purchase order yet, there may not be any process model instance that has been executed. Thus, if a message relating to a request for quote is received, the routing manager 118 may route the message to the orchestration engine 114 and the orchestration engine 114 may execute a new process model. The process model can then subscribe to messages on its own and if, at some later time, the customer who sent the request for quote, submits a purchase order based on the request, then related messages that match the subscription initialized by the new process model may be routed to the new process model and its receiving objects.

Figure 3:
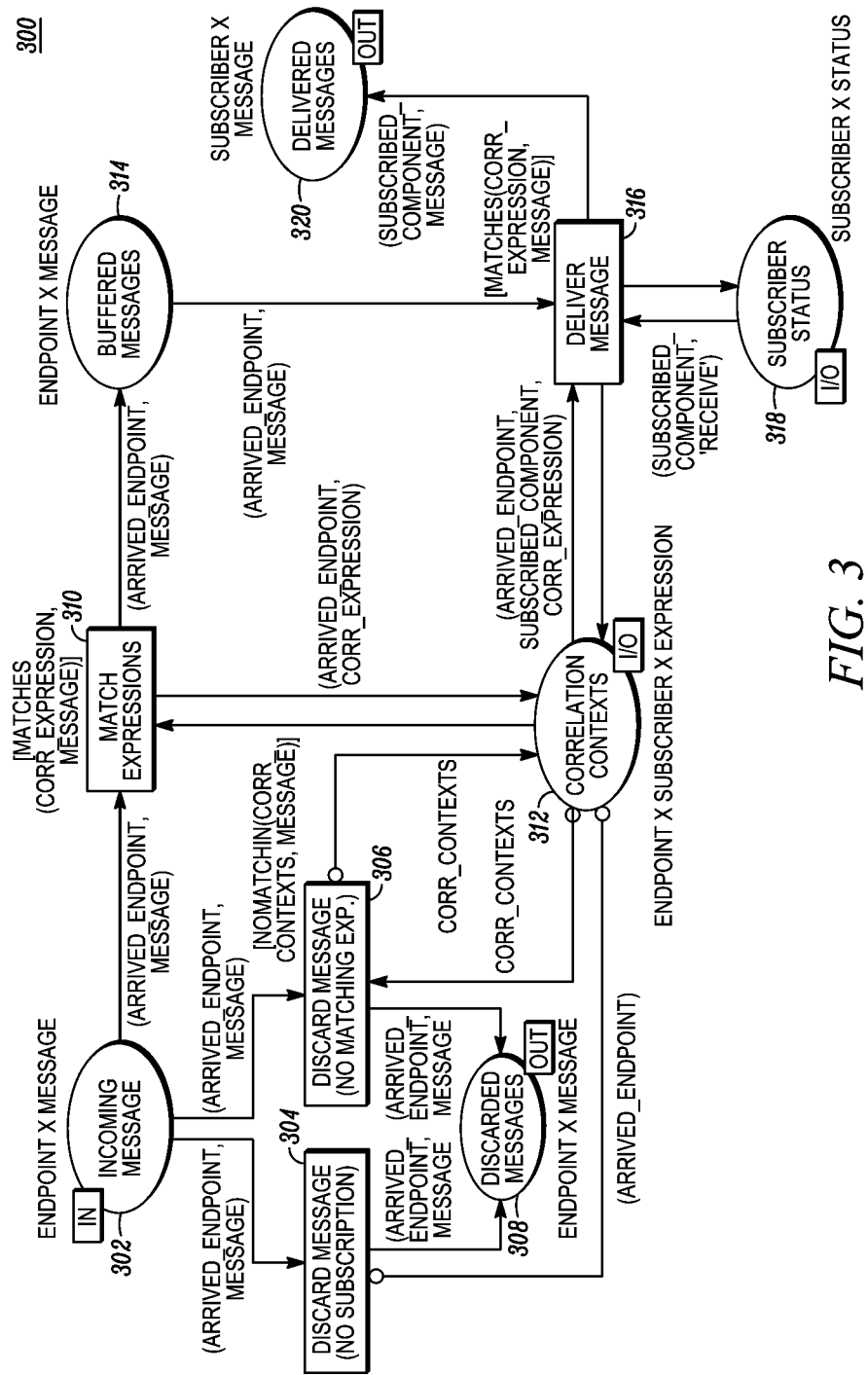
FIG. 3 is an exemplary colored petri net illustrating a flow of an incoming message as may be processed by the elements of the system of FIG. 1.

FIG. 3 is an exemplary colored petri net 300 illustrating an example flow of incoming messages as may be processed by the elements discussed above with respect to FIG. 1. An incoming message may be received at a messaging endpoint (302). For example, the incoming message may be received at a messaging endpoint such as messaging endpoint 117. In the example of FIG. 1, the incoming message may relate to the processing of a purchase order. The system 100 of FIG. 1 enables incoming messages to a shared messaging endpoint 117 to be routed to the correct process model instance out of multiple process model instances running in parallel and, more specifically, to be routed to the correct receiving object out of multiple receiving objects within a specific process model instance.

In practice, not all incoming messages will be routed to a specific receiving object. The incoming message may be discarded for one of a couple of reasons. For example, if there is no subscription, then the incoming message may be discarded (304). Additionally and/or alternatively, if there is no matching correlation expression, then the incoming message may be discarded (306). If the incoming message is discarded for one of the reasons, then the message may be discarded out of the messaging endpoint (308). If a message is discarded, a rejection message may be returned to the sender of the message.

Incoming messages may be accepted if a subscription has been initialized and the incoming message includes an expression that matches the correlation expression contained in the subscription (310, 312). On arrival of the incoming message at a messaging endpoint, the message is matched against all of the available subscriptions and correlation contexts (310, 312) and the associated correlation expressions. The place correlation contexts (312) may contain all active correlation contexts and subscriptions for the orchestration engine 114. In one implementation, tokens may be used and placed at the correlation context (312) when a correlation context and/or subscription is initialized. Similarly, tokens may be removed when a correlation context and/or subscription is terminated. Since subscriptions and correlation contexts are placed for a particular messaging endpoint, both the expression and the endpoint have to match for the incoming message to be accepted.

Figure 4:
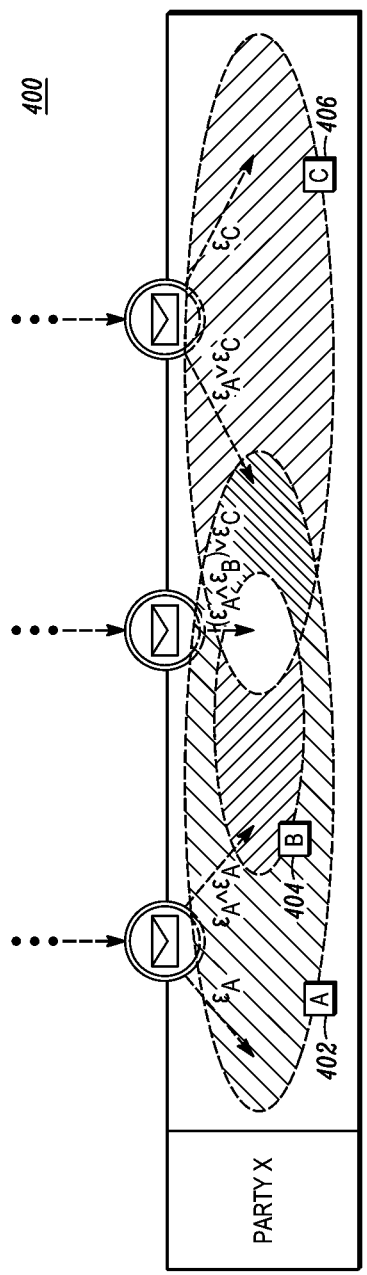
FIG. 4 is an exemplary illustration of overlapping and nested correlation contexts.

Accepted incoming messages may be stored in a buffer (314). For example, message repository 116 of FIG. 1 may be used as a buffer for incoming messages. Once the incoming message has been accepted and may be stored in a buffer (314), the message needs to be delivered (316). If there is a single matching subscription for the accepted message, thus designating a single receiving object, then the message is delivered to that receiving object (316). However, it is possible for competition among process model instances and/or receiving objects within the same process model instance for the same accepted message. In these cases, the subscriptions and/or the correlation contexts may be said to be overlapping and/or nested, as is illustrated and described more fully below in FIG. 4. In the example of FIG. 1, the routing manager 118 determines which process instance and/or receiving object within a given process model instance should receive the message when there are overlapping or nested subscriptions and/or correlation contexts. Since a subscription and/or correlation context may be placed on initialization of a process model, the particular receiving object within a given instance may not yet have reached a receive state.

In one exemplary implementation, the routing manager 117 may look to the subscriber status (318) to determine the first receiving object out of the multiple receiving objects competing for the same message to reach a receive state. The orchestration engine 114 may place tokens with the routing manager 118 to indicate when a particular receiving object has reached a receive state. The first receiving object to reach the received state, based upon a token arrival time, may receive the accepted message. Thus, the routing manager 117 may apply a first-come-first-serve principle to deliver accepted messages to competing receiving objects. Thus, the routing manager 117 and other components in the system 100 may be configured to allow overlapping subscriptions and correlation contexts.

Alternatively, the routing manager 117 may use the time at which the subscription and/or correlation context was initialized to determine which receiving object should receive the accepted message, irrespective of whether or not the receiving object has reached a receive state.

In another exemplary implementation, it is possible that multiple receiving objects are competing for the same message and that multiple receiving objects reach a received state at the same time or are at least in a received state at the time the incoming message arrives. In this case, the routing manager 118 may deliver the accepted message in a non-deterministic and, thus, arbitrary manner. Alternatively, the routing manager 118 may deliver the accepted message based on a statically defined priority per process model. Thus, messages may be delivered based on the order of priorities of the subscribed processes. In another exemplary implementation, the routing manager 118 may deliver the message based on a combination of first-in-first-out and static priorities.

Once the accepted message has been delivered (318), then the delivered message may be marked as having been delivered (320).

As mentioned above, FIG. 4 provides an illustration 400 of overlapping and nested correlation contexts. Illustration 400 includes correlation context A (402), correlation context B (404) and correlation context C (406). Context B (404) is hierarchically nested in context A (402). Context C (406) overlaps with both contexts A (402) and B (404). As discussed above with respect to FIG. 3, the routing manager 118 may determine which context receives a message that matches more than one correlation context.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A system including instructions recorded on a computer-readable medium and executable by at least one processor, the system comprising:
    an orchestration engine that is arranged and configured to cause the least one processor to execute multiple, concurrently running instances of a process model, wherein each of the instances of the process model includes one or more receiving objects;
    a messaging endpoint that is arranged and configured to be shared by the instances of the process model and that is arranged and configured to receive messages;
    a subscription handler that is arranged and configured to handle multiple subscriptions fog the multiple instances of the process model and arranged and configured to cause the least one processor to:
        define a first subscription for a first instance of the multiple instances of the process model, the first subscription including a correlation expression, an association with the messaging endpoint, and an association with a first receiving object of multiple receiving objects within the first instance, wherein the correlation expression allows a definition of one or more arbitrary correlation expressions to be used for matching operations on received messages,
        associate the first subscription with the first instance, and
        initialize the first subscription associated with the first instance; and
    a routing manager that is arranged and configured to cause the least one processor to route received messages that match the first subscription to the first receiving object.

2. The system of claim 1 wherein the correlation expression includes an attribute-based correlation expression.

3. The system of claim 1 wherein the correlation expression includes a function-based correlation expression.

4. The system of claim 1 wherein the correlation expression includes a combination of an attribute-based correlation expression and a function-based correlation expression.

5. The system of claim 1 wherein the subscription handler is further arranged and configured to cause the least one processor to modify the first subscription by changing the correlation expression during execution of the first instance.

6. The system of claim 1 wherein the subscription handler is further arranged and configured to cause the least one processor to terminate the first subscription during execution of the first instance.

7. The system of claim 1 wherein:
    the subscription handler is further arranged and configured to cause the least one processor to:
        define a second subscription for the first instance, the second subscription including the same correlation expression as in the first subscription, the association with the messaging endpoint, and an association with a second receiving object within the first instance,
        associate the second subscription with the first instance,
        initialize the second subscription associated with the first instance, and
        group the first subscription and the second subscription into a single correlation context; and
    the routing manager is further arranged and configured to cause the least one processor to route received messages that match the single correlation context to one of the first receiving object and the second receiving object based on a state of the first receiving object and the second receiving object.

8. The system of claim 1 wherein:
    the subscription handler is further arranged and configured to cause the least one processor to:
        define a new instance subscription, the new instance subscription including a correlation expression that defines when a new instance of the process model is to be executed and an association with the messaging endpoint, and
        initialize the new instance subscription;
    the routing manager is further arranged and configured to cause the least one processor to route a received message that matches the new instance subscription to the orchestration engine; and
    the orchestration engine is further arranged and configured to cause the least one processor to execute the new instance of the process model in response to receiving the message that matches the new instance subscription.

9. The system of claim 1 wherein the routing manager is further arranged and configured to cause the least one processor to:
    discard the received messages that do not match any of the subscriptions being handled by the subscription handler; and
    optionally send a message rejection notification to a sender of the received messages.

10. The system of claim 1 wherein:
the subscription handler is further arranged and configured to cause the least one processor to:
  group the first subscription into a first correlation context, and
  group the first subscription into a second correlation context such that the first correlation context and the second correlation context overlap based on the first subscription; and
the routing manager is further arranged and configured to cause the least one processor to route received messages that match one of the first correlation context and the second correlation context to the first receiving object.

11. A method comprising:
executing multiple, concurrently running instances of a process model, wherein each of the instances of the process model includes one or more receiving objects;
defining a first subscription for a first instance of the multiple instances of the process model, the first subscription including a correlation expression, an association with a messaging endpoint, and an association with a first receiving object of multiple receiving objects within the first instance, wherein the correlation expression allows a definition of one or more arbitrary correlation expressions to be used for matching operations on received messages;
associating the first subscription with the first instance;
initializing the first subscription; and
routing messages received at the messaging endpoint that match the first subscription to the first receiving object.

12. The method as in claim 11 further comprising modifying the first subscription by changing the correlation expression during execution of the first instance.

13. The method as in claim 11 further comprising terminating the first subscription during execution of the first instance.

14. The method as in claim 11 further comprising:
defining a second subscription for the first instance, the second subscription including the same correlation expression as in the first subscription, the association with the messaging endpoint, and an association with a second receiving object within the first instance;
associating the second subscription with the first instance;
initializing the second subscription;
grouping the first subscription and the second subscription into a single correlation context; and
routing messages received at the messaging endpoint that match the correlation context to one of the first receiving object and the second receiving object based on a state of the first receiving object and the second receiving object.

15. The method as in claim 11 further comprising:
defining a new instance subscription, the new instance subscription including a correlation expression that defines when a new instance of the process model is to be executed, and an association with the messaging endpoint;
initializing the new instance subscription;
routing a received message that matches the new instance subscription to an orchestration engine; and
executing the new instance of the process model in response to receiving the message that matches the new instance subscription.

16. A computer program product for enabling subscriptions for instance routing of messages, the computer program product being tangibly embodied on a non-transitory computer-readable medium and including executable code that, when executed, is configured to cause at least one data processing apparatus to execute an orchestration engine, the orchestration engine configured to:
execute multiple, concurrently running instances of a process model, wherein each of the instances includes one or more receiving objects;
spawn a subscription handler, the subscription handler arranged and configured to:
  define a first subscription for a first instance of the multiple instances of the process model, the first subscription including a correlation expression, an association with a messaging endpoint, and an association with a first receiving object of multiple receiving objects within the first instance, wherein the correlation expression allows a definition of one or more arbitrary correlation expressions to be used for matching operations on received messages,
  associate the first subscription with the first instance, and
  initialize the first subscription associated with the first instance; and
route messages received at the messaging endpoint that match the first subscription to the first receiving object.

17. The computer program product of claim 16 wherein the subscription handler is further arranged and configured to modify the first subscription by changing the correlation expression during execution of the first instance.

18. The computer program product of claim 16 wherein the subscription handler is further arranged and configured to terminate the first subscription during execution of the first instance.

19. The computer program product of claim 16 wherein:
the subscription handler is further arranged and configured to:
  define a second subscription for the first instance, the second subscription including the same correlation expression as in the first subscription, the association with the messaging endpoint, and an association with a second receiving object within the first instance,
  associate the second subscription with the first instance,
  initialize the second subscription associated with the first instance, and
  group the first subscription and the second subscription into a single correlation context; and
the orchestration engine is further arranged and configured to route received messages that match the single correlation context to one of the first receiving object and the second receiving object based on a state of the first receiving object and the second receiving object.

20. The computer program product of claim 16 wherein:
the subscription handler is further arranged and configured to:
  group the first subscription into a first correlation context, and
  group the first subscription into a second correlation context such that the first correlation context and the second correlation context overlap based on the first subscription; and
the orchestration engine is further arranged and configured to route received messages that match one of the first correlation context and the second correlation context to the first receiving object.

* * * * *